Nov. 18, 1924.                                          1,515,921
C. G. BALLARD
TOOL HANDLE WEDGE
Filed Feb. 13  1924
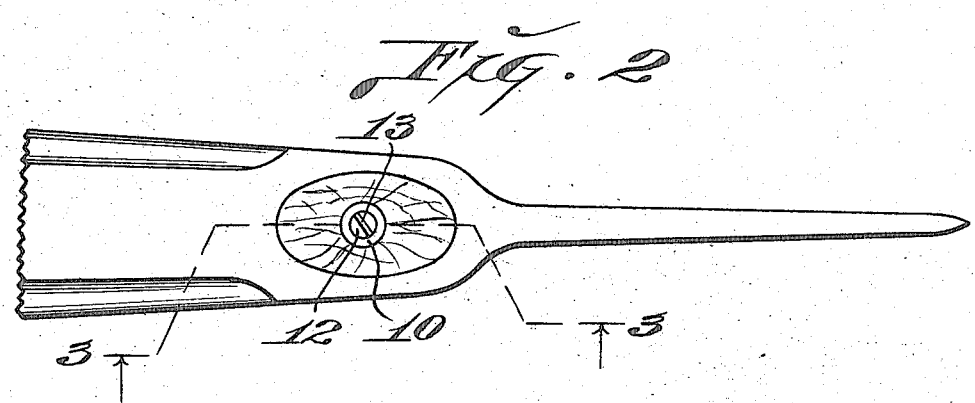
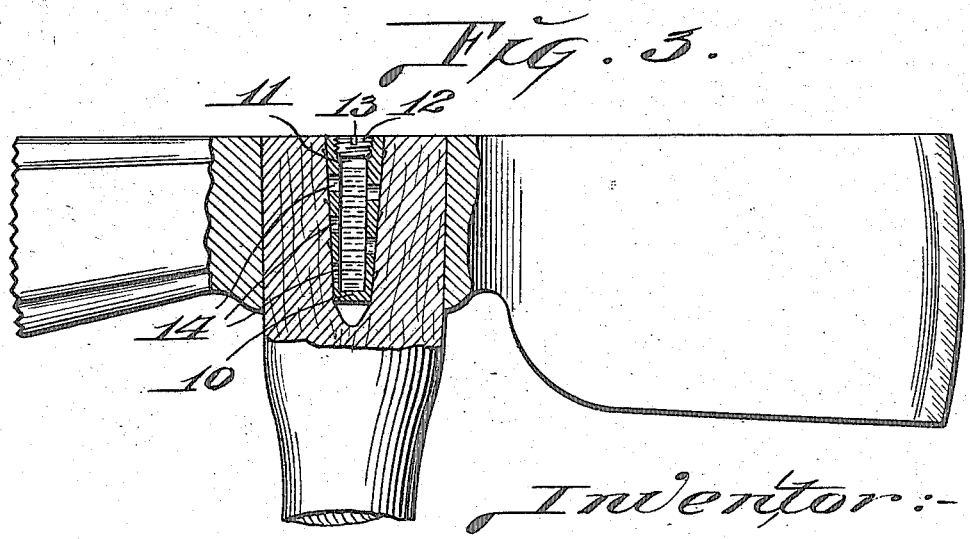
Inventor:-
Carey G. Ballard.
By Martin O. Smith atty.

Patented Nov. 18, 1924.

1,515,921

UNITED STATES PATENT OFFICE.

CAREY G. BALLARD, OF LOS ANGELES, CALIFORNIA.

TOOL-HANDLE WEDGE.

Application filed February 13, 1924. Serial No. 692,546.

*To all whom it may concern:*

Be it known that CAREY G. BALLARD, citizen of the United States, residing at Los Angeles, in the county of Los Angeles and State of California, has invented certain new and useful Improvements in Tool-Handle Wedges, of which the following is a specification.

My invention relates to a wedging device that is especially designed for use in firmly securing, in proper position upon their handles or shafts, the heads of hammers, hatchets, axes, sledges, mallets and like tools, or, in fact, any tool or article wherein a shaft of wood is positioned in an eye or socket and it is desired to produce a firm, tight and rigid connection.

The principal object of my invention is, to provide a wedging device of the character referred to, that may be easily and cheaply produced, readily applied for use and which will be very effective in performing its intended functions.

A further object of my invention is to construct the tool handle wedging device so that when properly applied for use, it will, in addition to performing its functions as a wedge, serve as a reservoir for a suitable liquid that will flow by absorption, into the adjacent wood, thereby swelling the fibres thereof with the result that the tool head, or part having the eye or socket will be very tightly secured to the handle or shaft.

With the foregoing and other objects in view, my invention consists in certain novel features of construction and arrangement of parts that will be hereinafter more fully described and claimed and illustrated in the accompanying drawings in which:

Fig. 1 is a perspective view of a tool handle wedge of my improved construction.

Fig. 2 is a top plan view of a hatchet and showing the wedge in position in the end of the handle thereof.

Fig. 3 is a sectional view taken on the line 3—3 of Fig. 2.

Referring by numerals to the accompanying drawings 10 designates the body of the wedge, the same being constructed from suitable metal and in the form of a tapered cylinder.

This body is made hollow, or provided with a longitudinally disposed chamber 11 that is normally closed at its upper end by a screw plug 12, having in its upper surface a slot 13 that is adapted to receive the end of a screw driver or like tool.

Formed through the wall of the wedge body and communicating with the chamber 11 therein is a series of small apertures 14, that permit the liquid that is placed within said chamber to flow outwardly, to be absorbed by that portion of the tool handle or shaft that surrounds the wedge.

Formed on the external surface of the wedge body are small outwardly and upwardly projecting prongs 15 that are adapted to engage in the body of the handle or shaft in which the wedge is seated, thereby insuring the retention of the wedge in the end of said handle or shaft, when driven thereinto.

In the use of my improved wedge, a suitable aperture or recess is formed in the end of the tool handle or shaft and after the latter is inserted in the eye or socket of the tool, the wedge is driven into said aperture until the outer face of the larger end of said wedge lies flush with the end of said handle or shaft.

Inasmuch as the body of the wedge is round in cross section and tapers lengthwise the surrounding body of the wood in the handle or shaft will be forced radially outward with practically uniform pressure in all directions, thereby very rigidly securing the tool head in proper position on said handle or shaft.

By removing screw plug 12, chamber 11 may be filled with a suitable liquid and the latter, passing outward through apertures 14 will be absorbed by the adjacent wood fibres, thereby causing the same to swell and consequently enhancing the firmness and rigidity of the connection between the head and handle.

Any suitable liquid may be used in the wedge, but I have found in practice, that boiled linseed oil produces excellent results, for, in addition to swelling the wood fibres and retaining them in such condition for a considerable period of time, it materially hardens and toughens the wood fibres and tends to preserve same.

Obviously, the supply of liquid within the wedge must be replenished from time to time.

While primarily intended for use in the handles and shafts of tools, wedges of my improved construction may be advantageously employed as an anchoring and securing means for the legs, rails and rungs of furniture, for the spokes of wooden wheels, in fact, for any structure wherein it is desirable or necessary to firmly secure the end of a wooden member in a socket, eye or the like.

Thus it will be seen that I have produced a tool handle wedge that possesses superior advantages in point of simplicity, durability and general efficiency.

Obviously, the construction of the device as herein shown and described may be varied in certain minor details of construction and in size and form, without departing from the spirit of the invention, the scope of which is set forth in the appended claims.

I claim as my invention:

1. As a new article of manufacture, a perforated, liquid containing tool handle wedge.

2. A tool handle wedge comprising a body having a chamber adapted to contain liquid, the wall of said body being perforated to permit the escape of the liquid from said chamber and a plug removably seated in said body for normally closing said chamber.

3. The combination with a tool handle and its receiving eye or socket, of a perforated, liquid containing wedge seated in that portion of the handle that is received by said eye or socket.

In testimony whereof I affix my signature.

CAREY G. BALLARD.